(12) United States Patent
Afrasiabi et al.

(10) Patent No.: US 12,134,483 B2
(45) Date of Patent: Nov. 5, 2024

(54) SYSTEM AND METHOD FOR AUTOMATED SURFACE ANOMALY DETECTION

(71) Applicant: The Boeing Company, Chicago, IL (US)

(72) Inventors: Amir Afrasiabi, University Place, WA (US); Zachary Ryan Smith, Hanahan, SC (US)

(73) Assignee: The Boeing Company, Arlington, VA (US)

( * ) Notice: Subject to any disclaimer, the term of this patent is extended or adjusted under 35 U.S.C. 154(b) by 361 days.

(21) Appl. No.: 17/653,760

(22) Filed: Mar. 7, 2022

(65) Prior Publication Data

US 2022/0289403 A1 Sep. 15, 2022

Related U.S. Application Data

(60) Provisional application No. 63/159,387, filed on Mar. 10, 2021.

(51) Int. Cl.
*G06K 9/00* (2022.01)
*B64F 5/10* (2017.01)
(Continued)

(52) U.S. Cl.
CPC .............. *B64F 5/60* (2017.01); *B64F 5/10* (2017.01); *G06T 7/0004* (2013.01); *G06T 17/10* (2013.01); *G06V 20/50* (2022.01)

(58) Field of Classification Search
CPC ..... G06T 7/0004; G06T 17/30; G06T 7/0002; G06T 17/10; G06T 19/20; G06T 17/205;
(Continued)

(56) References Cited

U.S. PATENT DOCUMENTS 10,210,631 B1   2/2019 Cinnamon et al.
10,459,444 B1  10/2019 Kentley-Klay
(Continued)

FOREIGN PATENT DOCUMENTS

EP       3792827 A1    3/2021

OTHER PUBLICATIONS

United States Patent and Trademark Office, Final Office action issued in U.S. Appl. No. 16/902,588, Sep. 16, 2022, 27 pages.
(Continued)

*Primary Examiner* — Utpal D Shah
*Assistant Examiner* — Kevin M Coomber
(74) *Attorney, Agent, or Firm* — Alleman Hall & Tuttle LLP

(57) ABSTRACT

A system for automated surface anomaly detection includes at least one processor which is configured to retrieve from non-volatile memory a 3D control image; capture a 3D target image depicting at least the portion of the exterior of a target object; generate 2D target planar images of the target object based on the 3D target image, using a first plurality of virtual cameras; generate 2D control planar images of the control object based on the 3D control image using a second plurality of virtual cameras, the 2D control planar images corresponding to the 2D target planar images of the target object; detect at least one difference between the 2D target planar images and the 2D control planar images; and generate and cause to be displayed an output image comprising a depiction of the target object with the at least one difference indicated.

20 Claims, 10 Drawing Sheets

(51) Int. Cl.
*B64F 5/60* (2017.01)
*G06T 7/00* (2017.01)
*G06T 17/10* (2006.01)
*G06V 20/50* (2022.01)

(58) Field of Classification Search
CPC ... G06T 2200/04; G06T 15/08; G06T 15/205; G06T 17/00; G06T 11/00; G06T 11/003; G01N 21/8851; B25J 9/1674; B25J 9/1697; G05B 19/41875; G06V 20/50; G06V 20/64; B64F 5/10; B64F 5/60; G06N 20/00; G06N 3/02; G06N 3/08
See application file for complete search history.

(56) References Cited

U.S. PATENT DOCUMENTS

| | | | |
|---|---|---|---|
| 10,643,329 | B2 | 5/2020 | Afrasiabi et al. |
| 10,957,017 | B1 | 3/2021 | Minor |
| 11,055,872 | B1 | 7/2021 | Chen et al. |
| 11,126,891 | B2 | 9/2021 | St. Romain, II et al. |
| 11,238,197 | B1 | 2/2022 | Douglas et al. |
| 11,263,487 | B2 | 3/2022 | Li et al. |
| 11,308,576 | B2 | 4/2022 | Yuan et al. |
| 11,341,699 | B1 | 5/2022 | Gottlieb |
| 2009/0274386 | A1 | 11/2009 | Panetta et al. |
| 2012/0189178 | A1 | 7/2012 | Seong |
| 2014/0308153 | A1* | 10/2014 | Ljungblad ............... B22F 10/28 419/53 |
| 2016/0085426 | A1 | 3/2016 | Scott |
| 2017/0301078 | A1 | 10/2017 | Forutanpour et al. |
| 2017/0357895 | A1 | 12/2017 | Karlinsky et al. |
| 2017/0372480 | A1 | 12/2017 | Anand et al. |
| 2018/0047208 | A1* | 2/2018 | Marin ................... H04N 13/257 |
| 2018/0129865 | A1 | 5/2018 | Zia et al. |
| 2018/0129910 | A1 | 5/2018 | Zia et al. |
| 2018/0130229 | A1 | 5/2018 | Zia et al. |
| 2018/0130355 | A1 | 5/2018 | Zia et al. |
| 2018/0330205 | A1 | 11/2018 | Wu et al. |
| 2018/0336741 | A1 | 11/2018 | Rezagholizadeh et al. |
| 2018/0349527 | A1 | 12/2018 | Li et al. |
| 2019/0118497 | A1 | 4/2019 | Kierbel et al. |
| 2019/0130603 | A1 | 5/2019 | Sun et al. |
| 2019/0164007 | A1 | 5/2019 | Liu et al. |
| 2019/0295302 | A1 | 9/2019 | Fu et al. |
| 2019/0311469 | A1 | 10/2019 | Afrasiabi et al. |
| 2019/0325574 | A1 | 10/2019 | Jin et al. |
| 2019/0391562 | A1 | 12/2019 | Srivastava et al. |
| 2020/0074674 | A1 | 3/2020 | Guo et al. |
| 2020/0134446 | A1 | 4/2020 | Soni et al. |
| 2020/0134494 | A1 | 4/2020 | Venkatadri |
| 2020/0151938 | A1 | 5/2020 | Shechtman et al. |
| 2020/0167161 | A1 | 5/2020 | Planche et al. |
| 2020/0175669 | A1 | 6/2020 | Bian et al. |
| 2020/0210779 | A1 | 7/2020 | Atsmon et al. |
| 2020/0293828 | A1 | 9/2020 | Wang et al. |
| 2020/0294201 | A1 | 9/2020 | Planche et al. |
| 2020/0311482 | A1 | 10/2020 | Soni et al. |
| 2020/0311913 | A1 | 10/2020 | Soni et al. |
| 2020/0368815 | A1 | 11/2020 | Baker et al. |
| 2020/0388017 | A1 | 12/2020 | Coffman |
| 2020/0393562 | A1 | 12/2020 | Staudinger et al. |
| 2021/0027107 | A1 | 1/2021 | Pekelny et al. |
| 2021/0034961 | A1 | 2/2021 | Lovell et al. |
| 2021/0097148 | A1 | 4/2021 | Bagschik et al. |
| 2021/0097691 | A1 | 4/2021 | Liu |
| 2021/0201078 | A1 | 7/2021 | Yao et al. |
| 2021/0232858 | A1 | 7/2021 | Mukherjee |
| 2021/0232926 | A1 | 7/2021 | Hutter et al. |
| 2021/0271019 | A1 | 9/2021 | Laffont et al. |
| 2021/0276587 | A1 | 9/2021 | Urtasun et al. |
| 2021/0286923 | A1 | 9/2021 | Kristensen et al. |
| 2021/0286925 | A1 | 9/2021 | Wyrwas et al. |
| 2021/0287050 | A1 | 9/2021 | Kar et al. |
| 2021/0325895 | A1 | 10/2021 | Huai |
| 2021/0358164 | A1 | 11/2021 | Liu et al. |
| 2021/0374402 | A1 | 12/2021 | Kim et al. |
| 2021/0383616 | A1 | 12/2021 | Rong et al. |
| 2021/0390674 | A1 | 12/2021 | Afrasiabi et al. |
| 2021/0397142 | A1 | 12/2021 | Lovell et al. |
| 2022/0005175 | A1 | 1/2022 | Mansell |
| 2022/0012596 | A1 | 1/2022 | Nie et al. |
| 2022/0020184 | A1 | 1/2022 | Rijken et al. |
| 2022/0035961 | A1 | 2/2022 | Ziabari et al. |
| 2022/0044074 | A1 | 2/2022 | Li et al. |
| 2022/0051479 | A1 | 2/2022 | Agarwal et al. |
| 2022/0067451 | A1 | 3/2022 | Wang et al. |
| 2022/0083807 | A1 | 3/2022 | Zhang et al. |
| 2022/0084173 | A1 | 3/2022 | Liang et al. |
| 2022/0084220 | A1 | 3/2022 | Pillai et al. |
| 2022/0091593 | A1 | 3/2022 | Neilan et al. |
| 2022/0101104 | A1 | 3/2022 | Chai et al. |
| 2022/0108417 | A1 | 4/2022 | Liu et al. |
| 2022/0108436 | A1 | 4/2022 | Kang et al. |
| 2022/0114698 | A1 | 4/2022 | Liu |
| 2022/0141422 | A1 | 5/2022 | Bathiche et al. |
| 2022/0156525 | A1 | 5/2022 | Guizilini et al. |
| 2022/0180595 | A1 | 6/2022 | Bethi et al. |
| 2022/0180602 | A1 | 6/2022 | Hao et al. |
| 2022/0189145 | A1 | 6/2022 | Evans et al. |
| 2022/0198339 | A1 | 6/2022 | Zhao et al. |
| 2022/0198609 | A1 | 6/2022 | Carbune et al. |
| 2022/0201555 | A1 | 6/2022 | Zeng et al. |
| 2022/0202295 | A1 | 6/2022 | Elbaz et al. |
| 2022/0230066 | A1 | 7/2022 | Das et al. |
| 2022/0234196 | A1 | 7/2022 | Tachikake |
| 2022/0238031 | A1 | 7/2022 | Evans et al. |
| 2022/0253599 | A1 | 8/2022 | Oh et al. |
| 2022/0254071 | A1 | 8/2022 | Ojha et al. |
| 2022/0254075 | A1 | 8/2022 | Kanazawa |
| 2022/0266453 | A1 | 8/2022 | Lonsberry et al. |
| 2022/0289403 | A1 | 9/2022 | Afrasiabi et al. |
| 2022/0306311 | A1 | 9/2022 | Kyono et al. |
| 2022/0309811 | A1 | 9/2022 | Haghighi et al. |
| 2022/0318354 | A1 | 10/2022 | Park et al. |
| 2022/0318464 | A1 | 10/2022 | Xu et al. |
| 2022/0318956 | A1 | 10/2022 | Xu |
| 2022/0327657 | A1 | 10/2022 | Zheng et al. |
| 2022/0335624 | A1 | 10/2022 | Maurer et al. |
| 2022/0335672 | A1 | 10/2022 | Lee et al. |
| 2022/0335679 | A1 | 10/2022 | Afrasiabi et al. |
| 2022/0358255 | A1 | 11/2022 | Burla et al. |
| 2022/0358265 | A1 | 11/2022 | Wang et al. |
| 2022/0361848 | A1 | 11/2022 | Wildeboer et al. |
| 2022/0366220 | A1 | 11/2022 | Roth et al. |
| 2022/0374720 | A1 | 11/2022 | Qu et al. |
| 2022/0375073 | A1 | 11/2022 | Voigt et al. |
| 2022/0377257 | A1 | 11/2022 | Wilson et al. |
| 2022/0392018 | A1 | 12/2022 | Chen et al. |
| 2023/0030088 | A1 | 2/2023 | Afrasiabi et al. |
| 2023/0043409 | A1 | 2/2023 | Afrasiabi |

OTHER PUBLICATIONS

European Patent Office, Extended European Search Report Issued in EP Application No. 22163745.7, Sep. 29, 2022, 7 pages.
European Patent Office, Extended European Search Report Issued in EP Application No. 22165086.4, Nov. 3, 2022, 6 pages.
Esfahani, S. et al., "A Survey of State-of-the-Art Gan-Based Approaches to Image Synthesis," Proceedings of the 9th International Conference on Computer Science, Engineering and Applications, Jul. 13, 2019, Toronto, Canada, 14 pages.
Luo, Y. et al., "Infrared Image Registration of Damage in the Aircraft Skin Based on Lie Group Machine Learning," Proceedings of the 2014 26th Chinese Control and Decision Conference (CCDC), May 31, 2014, Changsha, China, 5 pages.
Niu, S. et al., "Defect Image Sample Generation With GAN for Improving Defect Recognition," IEEE Transactions on Automation Science and Engineering, vol. 17, No. 3, Jul. 2020, 12 pages.
Wang, Z. et al., "Generative Adversarial Networks in Computer Vision: A Survey and Taxonomy," ACM Computing Surveys, vol. 54, No. 2, Feb. 9, 2021, 38 pages.

(56) References Cited

OTHER PUBLICATIONS

Xue, J. et al., "Interactive Rendering and Modification of Massive Aircraft CAD Models in Immersive Environment," Computer-Aided Design and Applications, vol. 12, No. 4, Jul. 4, 2015, 11 pages.

Zhu, J. et al., "Visual Object Networks: Image Generation with Disentangled 3D Representation," Proceedings of the 32nd Conference on Neural Information Processing Systems, Dec. 3, 2018, Montreal, Canada, 12 pages.

Zhu, J. et al., "Unpaired Image-to-Image Translation using Cycle-Consistent Adversarial Networks," Proceedings of the 2017 IEEE International Conference on Computer Vision, Oct. 22, 2017, Venice, Italy, 18 pages.

United States Patent and Trademark Office, Non-final Office action issued in U.S. Appl. No. 16/902,588, Aug. 12, 2022, 22 pages.

\* cited by examiner

SYSTEM AND METHOD FOR AUTOMATED SURFACE ANOMALY DETECTION

CROSS REFERENCE TO RELATED APPLICATIONS

This application claims priority to U.S. Provisional Patent Application Ser. No. 63/159,387, filed Mar. 10, 2021, the entirety of which is hereby incorporated herein by reference for all purposes.

FIELD

The present disclosure relates generally to aircraft inspection and, in particular, to the inspection of the skin of manufactured or assembled parts of aircraft using three-dimensional modeling.

BACKGROUND

In aircraft manufacturing, inspection of the skin of manufactured or assembled parts is performed to find defects and anomalies. Existing visual inspection of the skin of the aircraft relies primarily on human visual acuity and can therefore be subjective. In addition, visual inspection can be swayed by human interpretation. The ability to promptly identify and address aircraft skin defects and anomalies can minimize potential delays due to rework. In addition, there is a need for a consistent quality inspection process that can be implemented not only at a manufacturer's facility but also at other sites, where there may be less expertise on potential issues and inspection criteria than at the manufacturer's site.

SUMMARY

In view of the above, a system for automated surface anomaly detection is provided, including at least one processor, communicatively coupled to non-volatile memory storing a 3D (three-dimensional) control image depicting at least a portion of an exterior of a control object and instructions that, when executed by the processor, cause the processor to: retrieve from the non-volatile memory the 3D control image; capture, by a plurality of cameras, a 3D target image depicting at least the portion of the exterior of a target object; receive the 3D target image captured by the plurality of cameras, the 3D target image depicting at least the portion of the exterior of the target object; generate 2D (two-dimensional) target planar images of the target object based on the 3D target image, using a first plurality of virtual cameras; generate 2D control planar images of the control object based on the 3D control image, the 2D control planar images corresponding to the 2D target planar images of the target object, using a second plurality of virtual cameras; detect at least one difference between the 2D target planar images and the 2D control planar images; generate an output image, wherein the output image comprises a depiction of the target object with the at least one difference indicated; and cause the output image to be displayed.

The features, functions, and advantages that have been discussed can be achieved independently in various embodiments or can be combined in yet other embodiments further details of which can be seen with reference to the following description and drawings.

DETAILED DESCRIPTION

Figure 1:
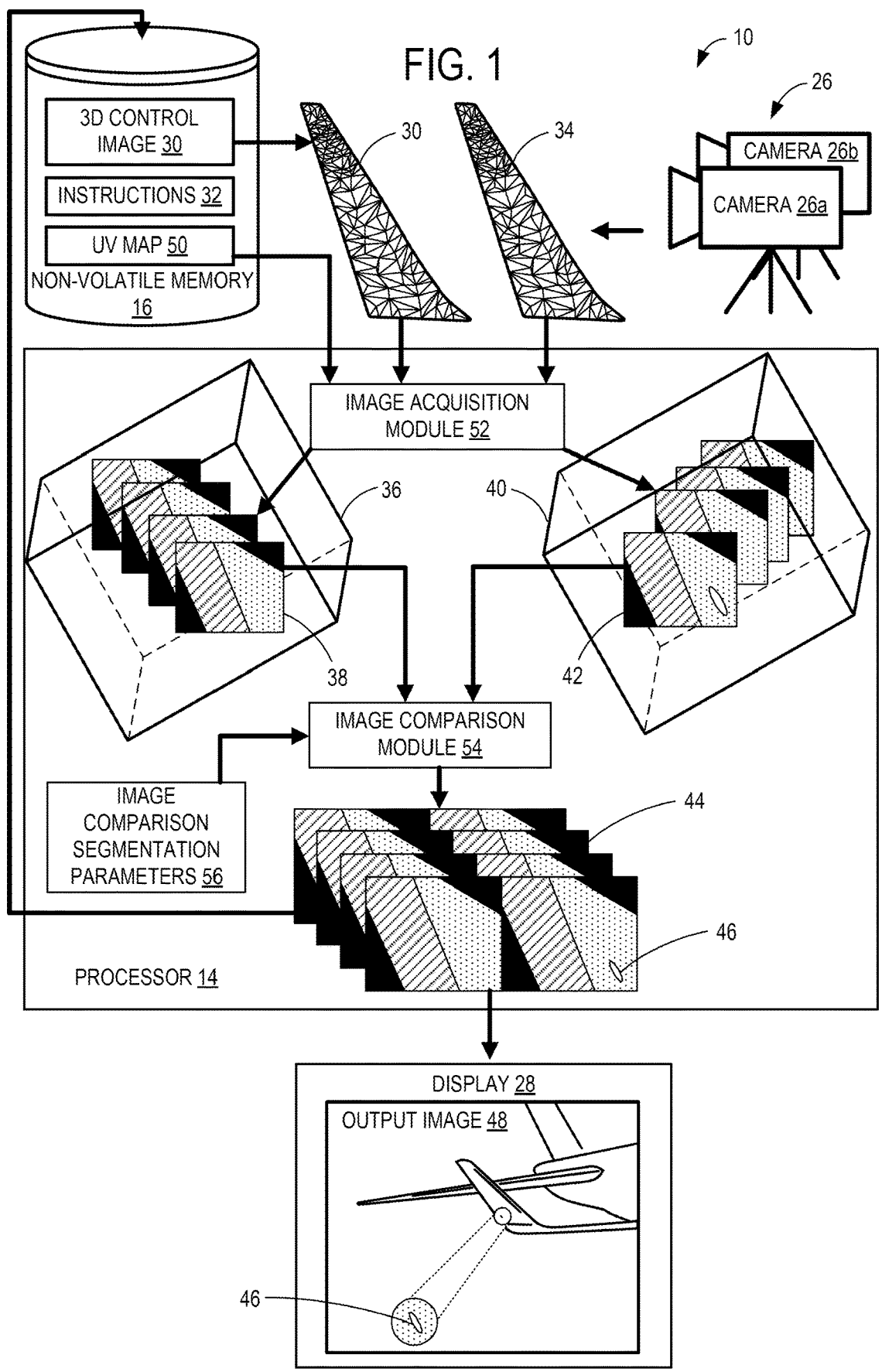
FIG. 1 is a general schematic diagram illustrating an overview of the system for automated surface anomaly detection, according to an embodiment of the subject disclosure.
Figure 2:
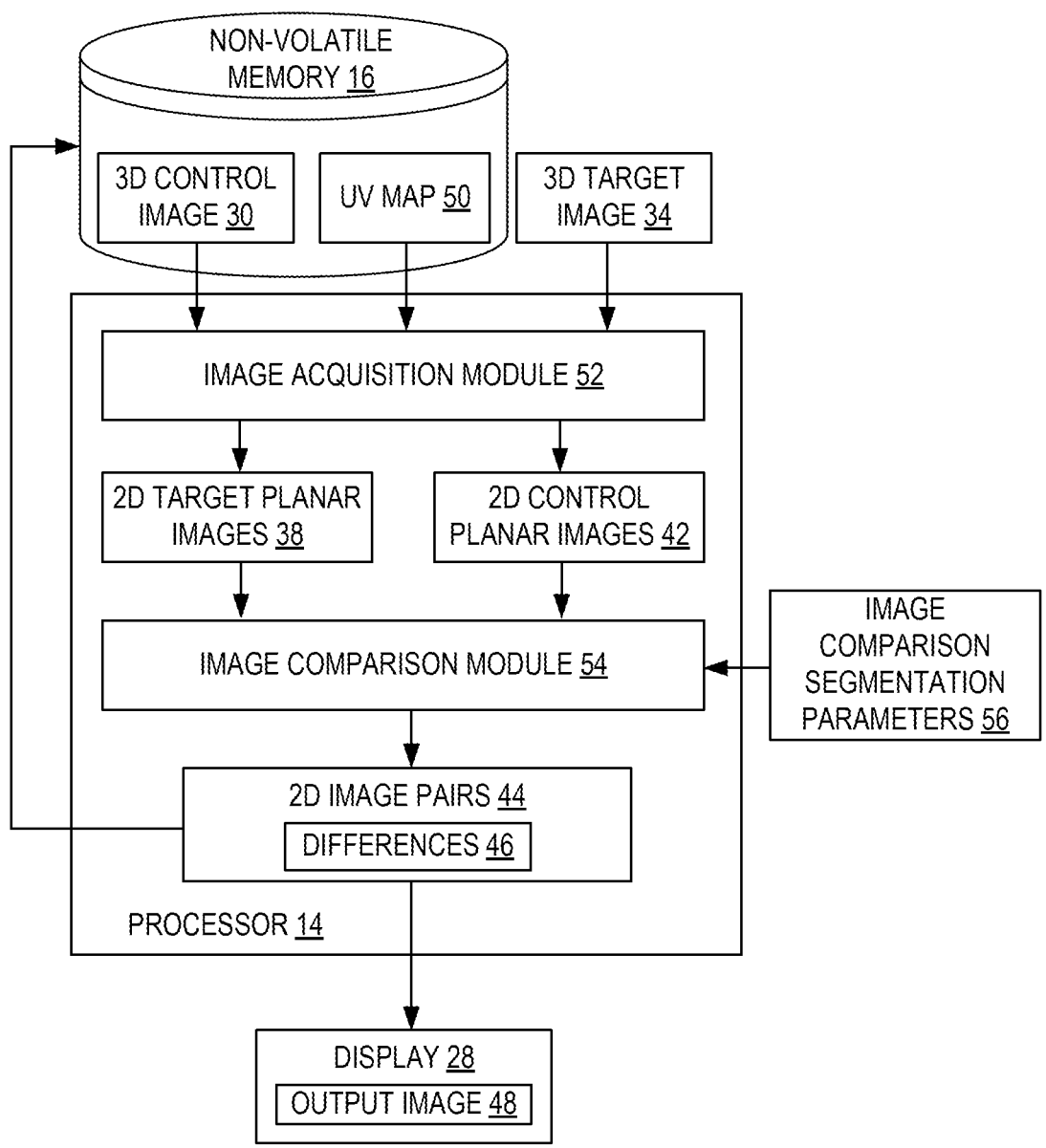
FIG. 2 is a general schematic diagram illustrating an overview of inputs and outputs for the processor of the system for automated surface anomaly detection, according to an embodiment of the subject disclosure.

In view of the above issues, as shown in FIGS. 1 and 2, a system 10 for automated surface anomaly detection is provided, comprising at least one processor 14, communicatively coupled to non-volatile memory 16 storing a 3D control image 30 depicting at least a portion of an exterior of a control object and instructions 32 that, when executed by the processor 14, cause the processor 14 to retrieve the 3D control image 30 from the non-volatile memory 16. The control object can be an aircraft or an aircraft component, for example. The processor 14 captures, by a plurality of cameras 26, a 3D target image 34 depicting at least the portion of the exterior of a target object, which can be an aircraft or an aircraft component, for example. However, it will be appreciated that the control object and the target object are not particularly limited to aircraft and aircraft components, and the control object and the target object can be any manufactured part or component. The sizes of the control objects and the target objects are not particularly limited—the control object and the target object can be micron-scale objects in such applications as printed circuit boards or medical devices, or oversized objects that are too large for physical inspection using conventional segment-by-segment inspection methods under other 3D reconstruction-based visual inspection systems. The 3D control image 30 and the 3D target image 34 can comprise polygons rendered in a cross-platform 3D graphics format, which can allow the 3D images 30, 34 to be accessed across multiple graphics platforms.

In this example, a first camera 26a and a second camera 26b are used to capture the 3D target image 34. However, it will be appreciated that the quantity of cameras 26 is not particularly limited, and more than two cameras 26 can be used to capture the 3D target image 34. The cameras 26 can include at least one depth camera, 3D scanner, visual sensors, RGB cameras, thermal cameras, LiDAR cameras, or a combination thereof. The non-volatile memory 16 can further store a UV map 50, onto which the 3D control image 30 and the 3D target image 34 can be projected. The 3D target image 34 and the 3D control image 30 can be 3D point clouds of at least one of visual, thermal imaging, LiDAR, radar, or humidity sensors. The 3D control image 30 serves as a reference image for purposes of automated image comparison to the 3D target image 34.

The processor 14 receives the 3D target image 34 captured by the plurality of cameras 26, the 3D target image 34 depicting at least the portion of the exterior of the target object. Using a first plurality of virtual cameras 36, the processor 14 generates 2D target planar images 38 of the target object based on the 3D target image 34. Using a second plurality of virtual cameras 40, the processor 14 generates 2D control planar images 42 of the control object based on the 3D control image 30, the 2D control planar images 42 corresponding to the 2D target planar images 38 of the target object, so that the poses and locations in the 2D target planar images 38 correspond to those in the 2D control planar images 42. The first plurality of virtual cameras 36 and the second plurality of virtual cameras 40 can take the 2D target planar images 38 and the 2D control planar images 42 as perpendicularly as possible to the surface of the 3D target image 34 and the 3D control image 30, respectively. Images can be taken along an entire surface and an entire curvature of the 3D target image 34 so that as many anomalies can be detected as possible. Surface anomalies can include dents, holes, scratches, tears, chips, cracks, peels, burns, delaminations, melted metal, and missing sealant, for example.

The processor 14 can be configured so that an image acquisition module 52 of the processor 14 receives, as input, the 3D control image 30, the UV map 50, and the 3D target image 34, generates the 2D target planar images 38 and the 2D control planar images 42, and outputs the 2D target planar images 38 and the 2D control planar images 42.

The processor 14 generates 2D image pairs 44 pairing the 2D control planar images 42 to the 2D target planar images 38. Comparing the 2D target planar images 38 to the 2D control planar images 42, the 2D image pairs 44 taken of the parts for both the target object and the control object are compared side-by-side. It will be appreciated that comparing the control object and the target object side-by-side and in the same graphical representation eliminates format conflicts and mismatches between 3D graphical systems and models. For each 2D image pair 44, the 2D control planar image 42 and the 2D target planar image 38 are taken in the same pose and at the same location. The processor 14 detects at least one difference 46 or anomaly between the 2D target planar images 38 and the 2D control planar images 42, identifying the coordinates of the identified difference 46 in both 3D space and the UV space in the UV map 50. The processor 14 then generate an output image 48 comprising a depiction of the target object with the at least one difference 46 indicated or annotated, and causes the output image 48 to be displayed on a display 28. The 2D image pair 44 and detected differences 46, including the coordinates of the identified differences 46 in both 3D space and the UV space in the UV map 50, can be stored in non-volatile memory 16 for later use in various applications, including the training of deep learning models for automatically classifying types of anomalies. A large body of images showing a target defect can be used to train a deep learning model to automatically classify the target defect. For example, thousands of image pairs showing an inward dent can be used to train a deep learning model to automatically classify the inward dent.

The processor 14 can be configured so that an image comparison module 54 of the processor 14 receives, as input, the 2D target planar images 38 and the 2D control planar images 42 as 2D image pairs 44, compares the 2D image pairs 44 taken of the parts for both the target object and the control object side-by-side, detects at least one difference 46 between the 2D target planar images 38 and the 2D control planar images 42, generates an output image 48 comprising a depiction of the target object with the at least one difference 46 indicated or annotated, and outputs the output image 48. The image comparison module 54 can accept image comparison segmentation parameters 56 for controlling how the difference 46 is indicated or annotated on the 2D image pairs 44. In this example, the difference 46 is indicated or annotated by a circle.

Figure 3:
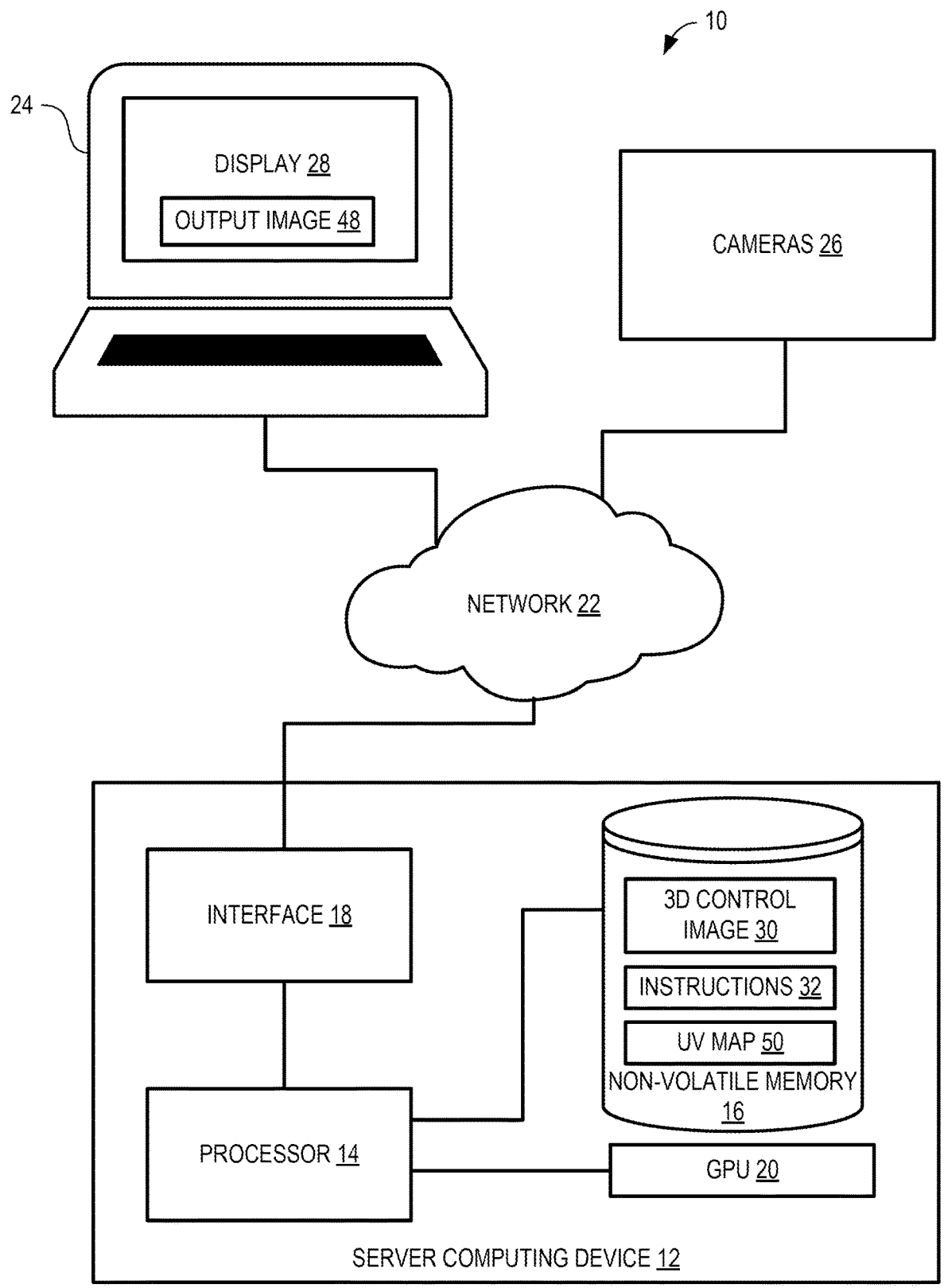
FIG. 3 is a general schematic diagram illustrating an overview of the system for automated surface anomaly detection including a server computing device, client computing device, and cameras connected to a network, according to an embodiment of the subject disclosure.

FIG. 3 is a schematic diagram of the system 10 for automated anomaly detection comprising a server computing device 12 which includes one or more processors 14, which can be communicatively coupled to a network 22. The server computing device 12 includes a network interface 18 to affect the communicative coupling to the network 22, and, through the network 22, a client computing device 24 and a plurality of cameras 26. The client computing device 24 comprises a display 28 which is configured to display an output image 48. Network interface 18 can include a physical network interface, such as a network adapter. The server computing device 12 can be a special-purpose computer, adapted for reliability and high-bandwidth communications. Thus, the system 10 can be embodied in a cluster of individual hardware server computers, for example. The processor 14 can be multi-core processors suitable for handling large amounts of information. The processor 14 is communicatively coupled to non-volatile memory 16 storing a 3D control image 30, UV map 50, and instructions 32, which can be executed by the processor 14 to effectuate the techniques disclosed herein on concert with the client computing device 24 as shown and described below. The non-volatile memory 16 can be in a Redundant Array of Inexpensive Disk drives (RAID) configuration for added reliability. The processor 14 can also be communicatively coupled to graphical co-processors (GPU) 20. Graphical co-processors can expedite the technique disclosed herein by performing operations in parallel.

Figure 4:
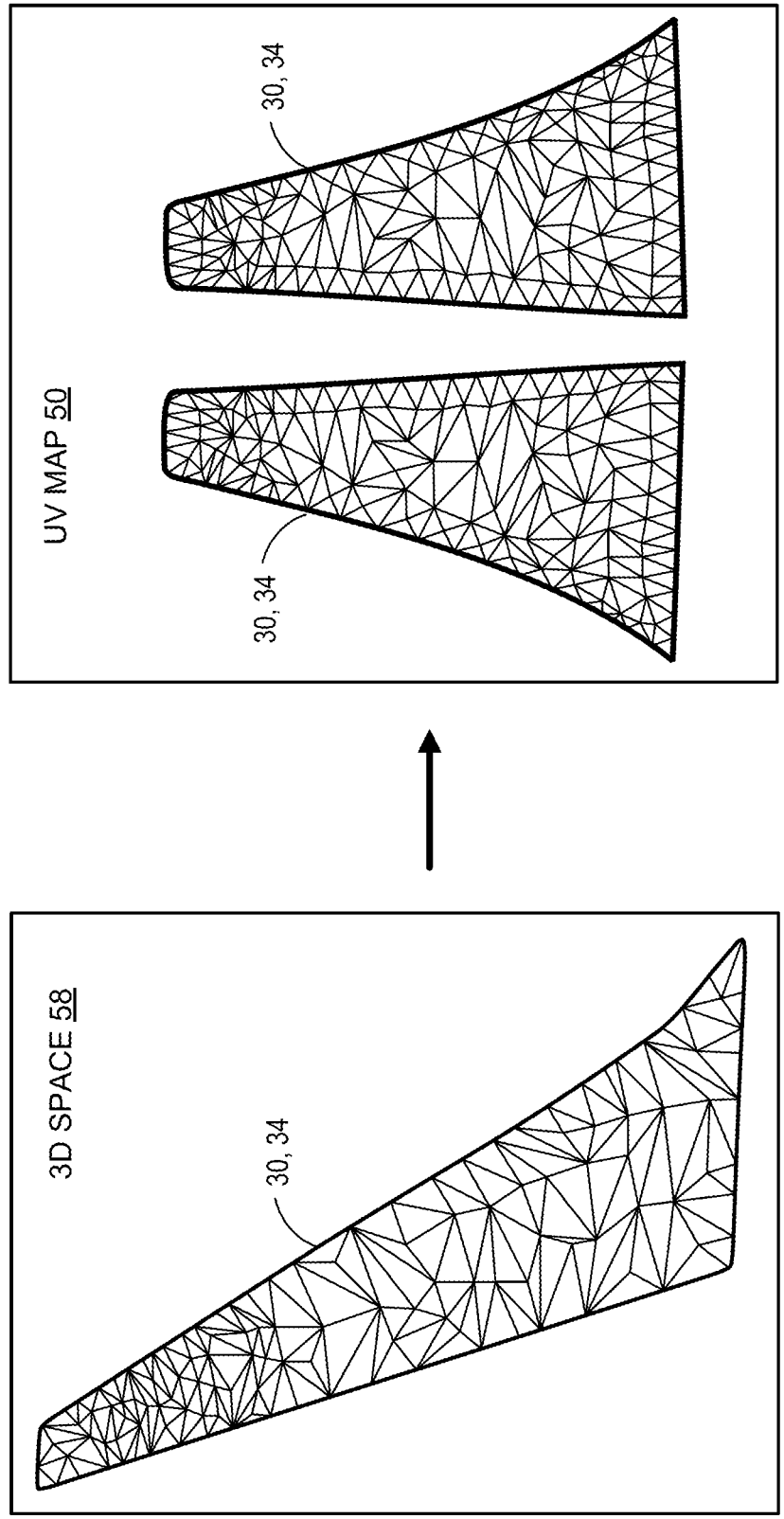
FIG. 4 is an illustration of the projection of a 3D image onto a UV map in the system for automated surface anomaly detection, according to an embodiment of the subject disclosure.

Referring to FIG. 4, the projection of the 3D image (3D control image 30 or 3D target image 34) onto a UV map 50 is depicted. For every point inside the mesh in the UV map 50, a corresponding point is found by the processor in the 3D space 58 using Barycentric coordinates. A UV coordinate is determined and stored for each vertex in a mesh of the 3D image, so that the contours, vertices, faces, and edges of the 3D image in the 3D space 58 correspond to those in the UV map 50. Accordingly, the processor projects the 3D control image 30 and the 3D target image 34 in UV space of the UV map 50. Further, when an anomaly or difference is detected in the 3D target image 34, the location of the difference can be identified in the coordinates of both the 3D space 58 and the UV map 50, thereby eliminating expensive localization and mapping processing.

Figure 5:
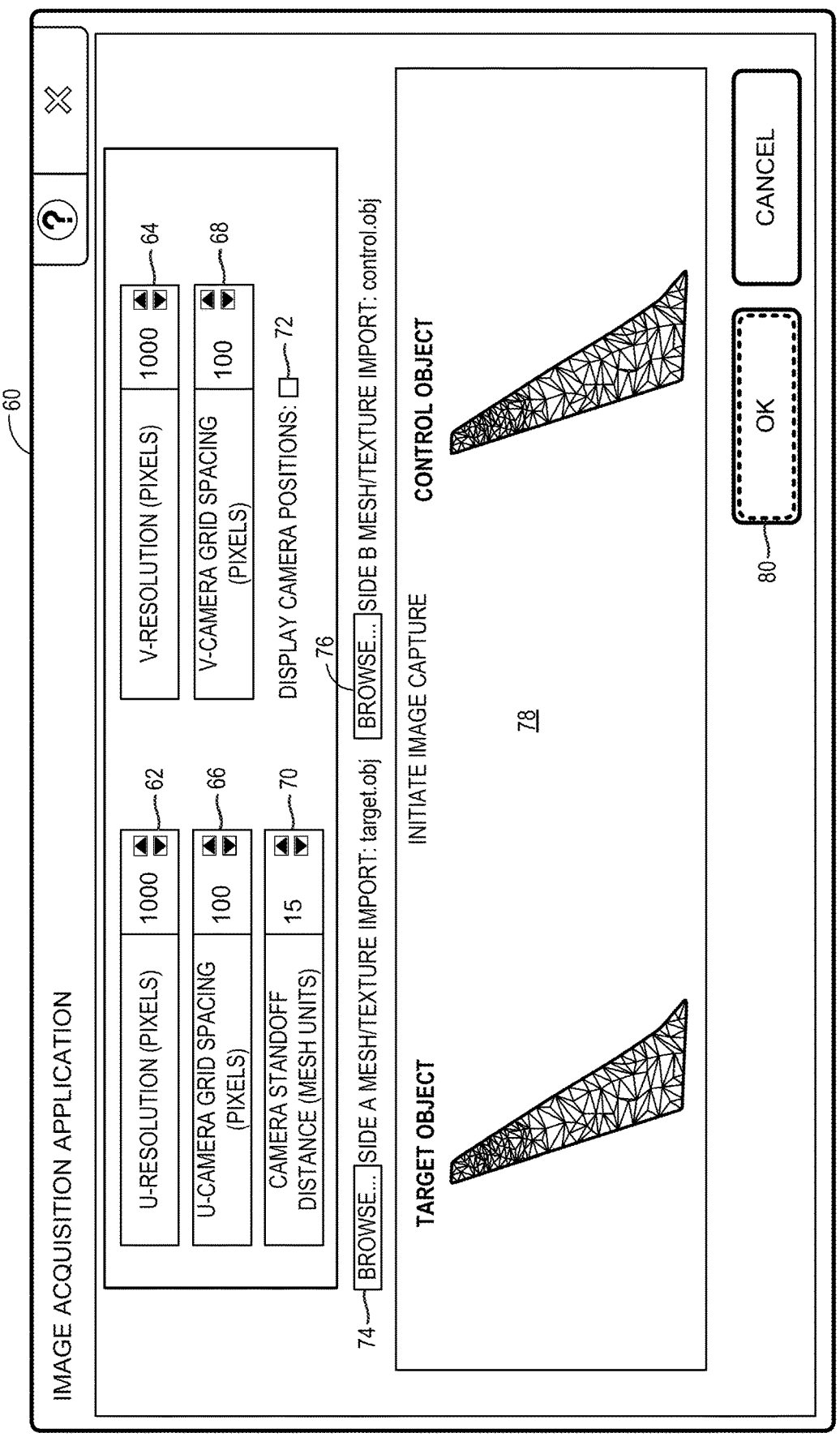
FIG. 5 is an illustration of a user interface for the image acquisition module of the system for automated surface anomaly detection, according to an embodiment of the subject disclosure.

Referring to FIG. 5, a user interface 60 for the image acquisition module is illustrated. The user interface 60 includes a first field 62 to select a U-resolution, a second field 64 to select a V-resolution, a third field 66 to select a grid spacing for the virtual U-cameras, a fourth field 68 to select a grid spacing for the virtual V-cameras, and a fifth field 70 to select a camera standoff distance from the surface of the polygons of the 3D images. A check box 72 can be provided to toggle the display of camera positions. A first browse button 74 can be provided to select a 3D target object, and a second browse button 76 can be provided to select a 3D control object. An image capture window 78 can display the 3D target object and the 3D control object. Upon clicking the OK button 80, the image acquisition module can proceed to receive the 3D target object and the 3D control object, instantiate the virtual cameras in accordance with the properties entered in the first field 62, second field 64, third field 66, fourth field 68, and fifth field 70, and generate the 2D target planer images and 2D planar images accordingly.

Figure 6:
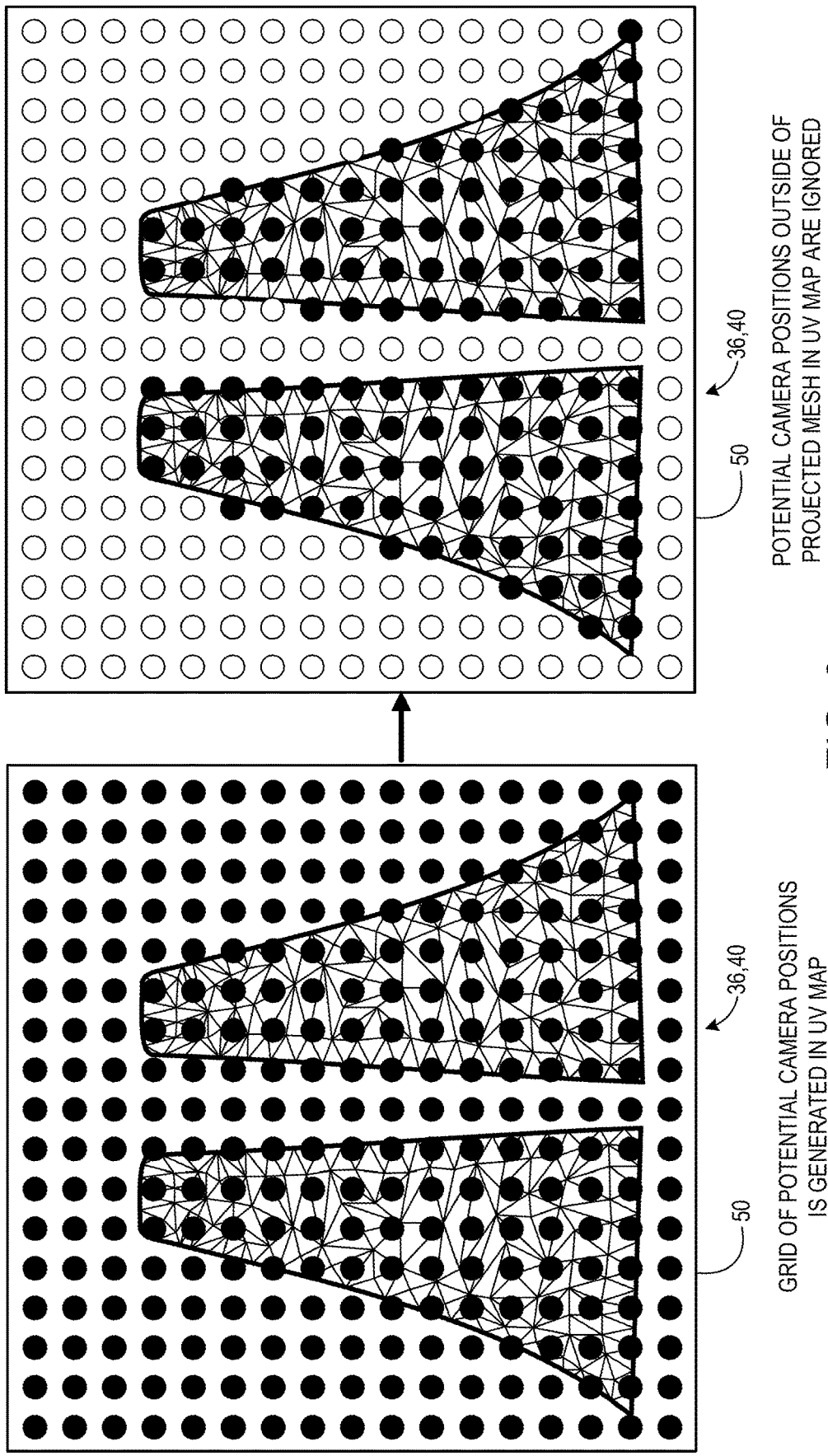
FIG. 6 is an illustration of the instantiation of virtual cameras in a grid at positions in 3D space in the system for automated surface anomaly detection, according to an embodiment of the subject disclosure.

Referring to FIG. 6, the arrangement of the first plurality of virtual cameras 36 or second plurality of virtual cameras 40 in a grid in the UV map 50 is depicted. A grid of potential camera positions is generated in UV map 50. The grid spacing for the virtual U-cameras is configured in accordance with the selection in the third field 66 in the user interface 60, and the grid spacing for the virtual V-cameras is configured in accordance with the selection in the fourth field 68 in the user interface 60. Then, the camera positions outside of the projected mesh in the UV map are ignored. The ignored camera positions are depicted as white circles in the depiction of FIG. 6. Accordingly, the processor arranges the first plurality of virtual cameras 36 and the second plurality of virtual cameras 40 in a grid in the UV space of the UV map 50. In some embodiments, the processor can determine the optimal grid spacing for the virtual U-cameras and the virtual V-cameras that allow the virtual cameras to face the polygons of the 3D image in a perpendicular orientation, or an orientation within a predetermined deviation from perpendicular orientation to the surface of the polygons.

Figure 7:
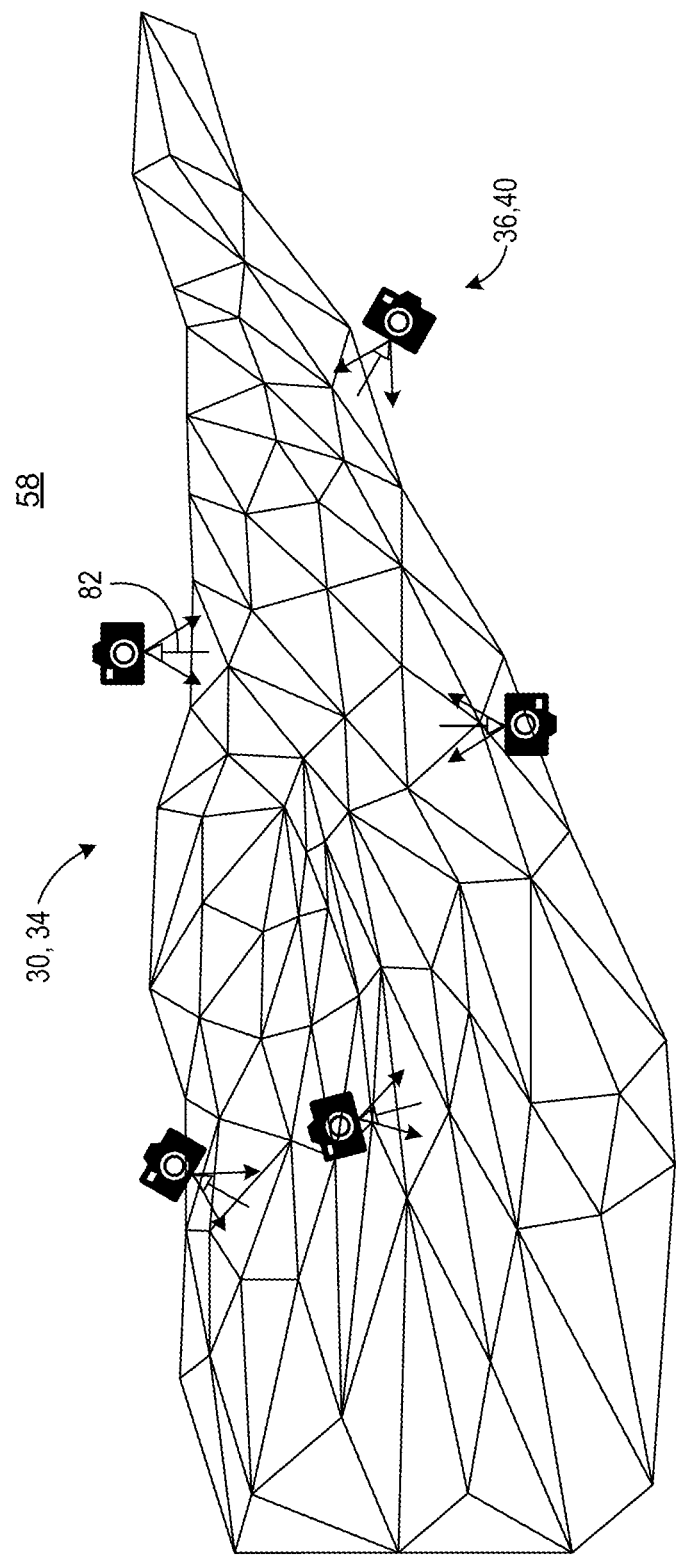
FIG. 7 is an illustration of the instantiation of virtual cameras at positions in 3D space in a normal direction at a predetermined distance from each of the polygons of a 3D image in the system for automated surface anomaly detection, according to an embodiment of the subject disclosure.

Referring to FIG. 7, the instantiation of virtual cameras 36, 40 is depicted at positions in 3D space 58 facing each of the polygons of the 3D image 30, 34 in a normal direction at a predetermined distance 82 from each of the polygons. The camera standoff distance 82 from the surface of the polygons of the 3D images is configured in accordance with the fifth field 70 of the user interface 60. The 3D target image 34 and the 3D control image 30 are manipulated by the processor so that point of view angles, lighting and associated shadows, and/or virtual camera distances from target object of 2D target planar images match those from control object of 2D control planar images. Accordingly, lighting condition biases are removed, and 2D planar images are taken by the virtual cameras 36, 40 that face the polygons of the 3D image 30, 34 in a perpendicular orientation, or an orientation within a predetermined deviation from perpendicular orientation to the surface of the polygons. The predetermined deviation can be 5% to 10% from perpendicular orientation, for example.

Figure 8:
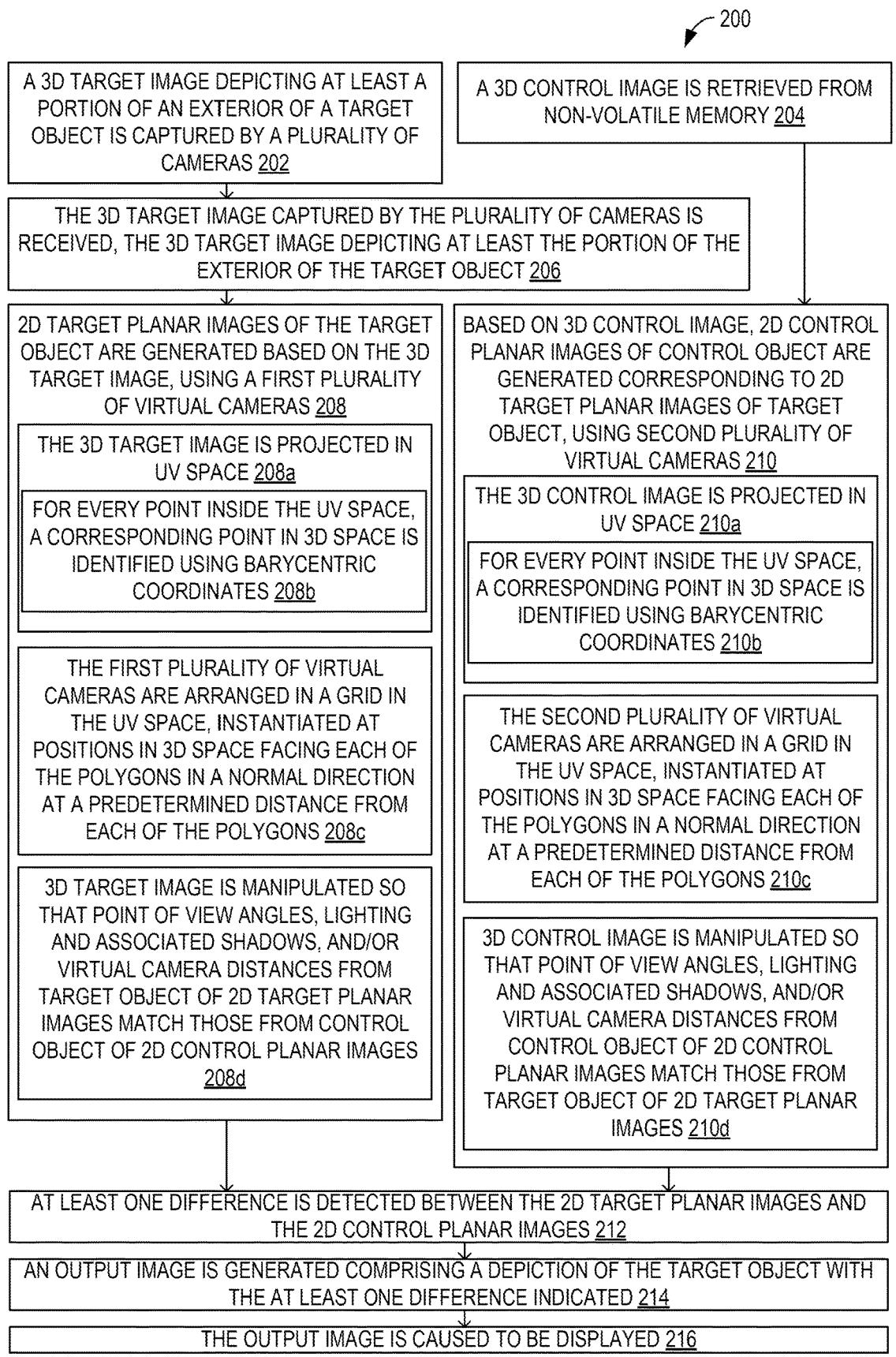
FIG. 8 is a flowchart of a method for automated surface anomaly detection, according to an embodiment of the subject disclosure.

FIG. 8 shows an exemplary method 200 for automated anomaly detection according to an example of the present disclosure. The following description of method 200 is provided with reference to the software and hardware components described above and shown in FIGS. 1 through 3. It will be appreciated that method 200 also can be performed in other contexts using other suitable hardware and software components.

At step 202, a 3D target image depicting at least a portion of an exterior of a target object is captured by a plurality of cameras, which can be a 3D scanner or at least one depth camera. At step 204, a 3D control image, which can comprise polygons, is retrieved from non-volatile memory. At step 206, the 3D target image captured by the plurality of cameras is received, the 3D target image depicting at least the portion of the exterior of the target object. The 3D target image can comprise polygons. The target object and the control object can be aircraft or aircraft components.

At step 208, 2D target planar images of the target object are generated based on the 3D target image, using a first plurality of virtual cameras. Step 208 can include step 208*a*, at which the 3D target image is projected in UV space. Step 208*a* can include step 208*b*, in which for every point inside the UV space, a corresponding point in 3D space is identified using Barycentric coordinates. Step 208 can further include step 208*c*, in which the first plurality of virtual cameras are arranged in a grid in the UV space, instantiated at positions in 3D space facing each of the polygons in a normal direction at a predetermined distance from each of the polygons. Step 208 can further include step 208*d*, in which the 3D target image is manipulated so that point of view angles, lighting and associated shadows, and/or virtual camera distances from target object of 2D target planar images match those from control object of 2D control planar images. Accordingly, lighting condition biases are removed.

At step 210, based on 3D control image, 2D control planar images of control object are generated corresponding to 2D target planar images of target object, using second plurality of virtual cameras. Step 210 can include step 210*a*, in which the 3D control image is projected in UV space. Step 210*a* can include step 210*b*, in which for every point inside the UV space, a corresponding point in 3D space is identified using Barycentric coordinates. Step 210 can further include step 210*c*, in which the second plurality of virtual cameras are arranged in a grid in the UV space, instantiated at positions in 3D space facing each of the polygons in a normal direction at a predetermined distance from each of the polygons. Step 210 can further include step 210*d*, in which the 3D control image is manipulated so that point of view angles, lighting and associated shadows, and/or virtual camera distances from control object of 2D control planar images match those from target object of 2D target planar images.

At step 212, at least one difference is detected between the 2D target planar images and the 2D control planar images. At step 214, an output image is generated comprising a depiction of the target object with the at least one difference indicated or annotated. At step 216, the output image is caused to be displayed.

Figure 9:
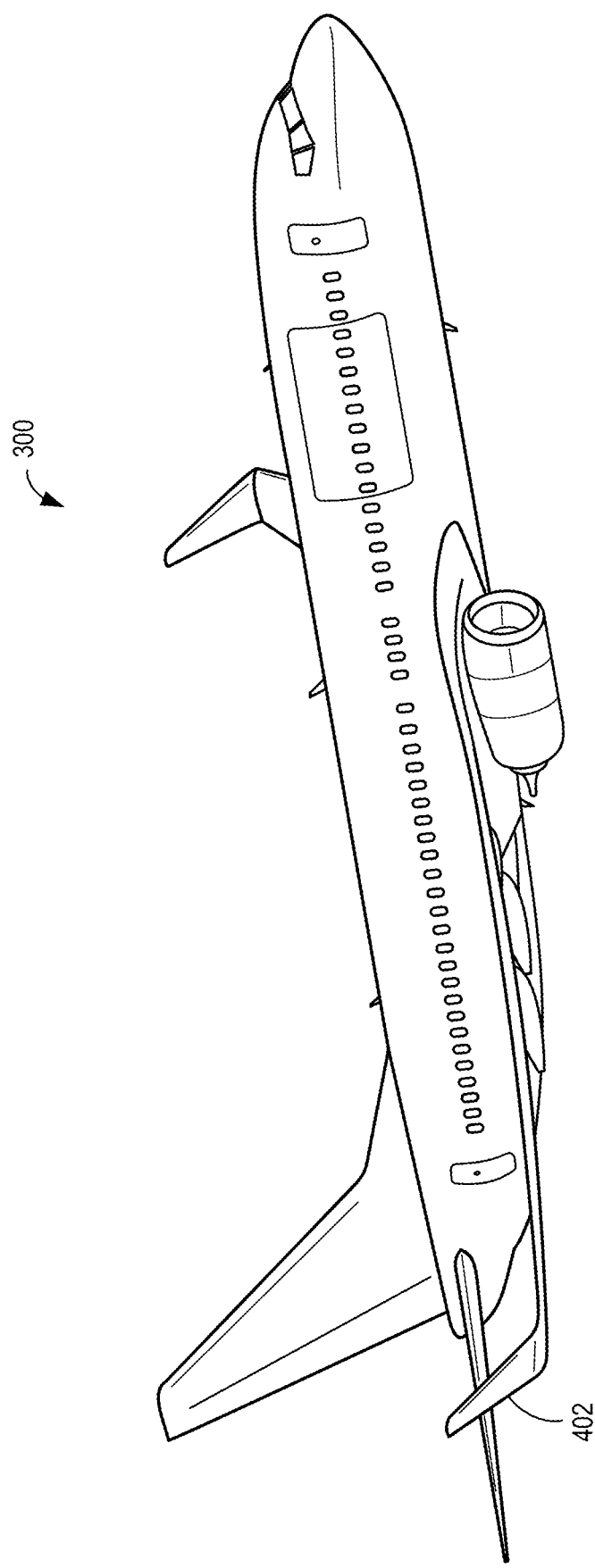
FIG. 9 is an illustration of an aircraft that can be inspected by the system for automated surface anomaly detection, according to an embodiment of the subject disclosure.

FIG. 9 is an image of an aircraft 300 according to some embodiments. It will be appreciated that the aircraft 300 or the components thereof can be the target object or the control object of the 3D target image or the 3D control image, respectively, that are inspected in accordance with the system 10 and method 200 of the subject disclosure.

The systems and processes described herein have the potential benefit of replacing subjective visual inspections based on human visual acuity and swayed by human interpretation with objective, computer-aided inspections based on unbiased evaluation of image data. This enables the inspection of the surfaces of manufactured parts in a simulated virtual and automated environment, in which lighting conditions can be controlled to be uniform. In other words, uniform light intensity and light angle can be achieved with light condition biases eliminated. Thus, thorough coverage of the surfaces of any manufactured part or component, including micro-scale and oversized parts and components, can be achieved without inadvertently missing any areas due to poor lighting conditions. Accordingly, expensive image capture apparatuses with rails or other support structures, multitudes of movable and static high definition cameras, and sensors to detect reflections, shadows, and other transient visual phenomena can be dispensed with to reduce costs and increase efficiencies in aircraft inspection. Indeed, unlike physical cameras, there is no physical limitation on the types and numbers of virtual cameras that can be applied to capture 2D planar images. Furthermore, expensive localization and mapping processing is eliminated by identifying the coordinates of identified anomalies in both 3D space and the UV space in the UV map. Having both the control object and the target object side-by-side and in the same graphical representation eliminates format conflicts and mismatches between different 3D graphical systems and models. Since modifications on the control object has the exact same effect on the target object, statistical quality control can be achieved, especially for the design of experiments where control variables are needed to identify significant factors on the quality and behavior of external surfaces.

Figure 10:
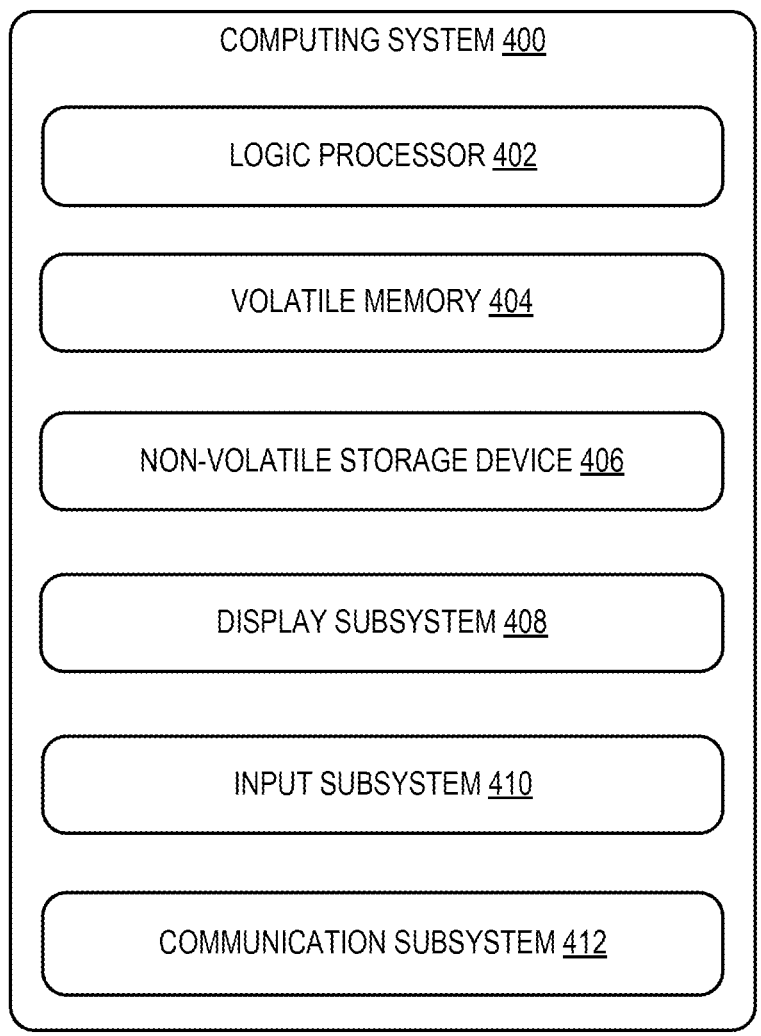
FIG. 10 is a schematic diagram illustrating an exemplary computing system that can be used to implement the system for automated surface anomaly detection of FIGS. 1-3.

FIG. 10 illustrates an exemplary computing system 400 that can be utilized to implement the system 10 and method 200 described above. Computing system 400 includes a logic processor 402, volatile memory 404, and a non-volatile storage device 406. Computing system 400 can optionally include a display subsystem 408, input subsystem 410, communication subsystem 412 connected to a computer network, and/or other components not shown in FIG. 9. These components are typically connected for data exchange by one or more data buses when integrated into single device, or by a combination of data buses, network data interfaces, and computer networks when integrated into separate devices connected by computer networks.

The non-volatile storage device 406 stores various instructions, also referred to as software, that are executed by the logic processor 402. Logic processor 402 includes one or more physical devices configured to execute the instructions. For example, the logic processor 402 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 402 can include one or more physical processors (hardware) configured to execute software instructions. Additionally or alternatively, the logic processor 402 can include one or more hardware logic circuits or firmware devices configured to execute hardware-implemented logic or firmware instructions. Processors of the logic processor 402 can be single-core or multi-core, and the instructions executed thereon can be configured for sequential, parallel, and/or distributed processing. Individual components of the logic processor 402 optionally can be distributed among two or more separate devices, which can be remotely located and/or configured for coordinated processing. Aspects of the logic processor 402 can be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 can be transformed—e.g., to hold different data.

Non-volatile storage device 406 can include physical devices that are removable and/or built-in. Non-volatile storage device 406 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 can include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 can include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of the security computing system 10 typically implemented in software by a processor to perform a particular function using portions of volatile memory, which function involves transformative processing that specially configures the processor to perform the function. Thus, a module, program, or engine can be instantiated via logic processor 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 408 typically includes one or more displays, which can be physically integrated with or remote from a device that houses the logic processor 402. Graphical output of the logic processor executing the instructions described above, such as a graphical user interface, is configured to be displayed on display subsystem 408.

Input subsystem 410 typically includes one or more of a keyboard, pointing device (e.g., mouse, trackpad, finger operated pointer), touchscreen, microphone, and camera. Other input devices can also be provided.

Communication subsystem 412 is configured to communicatively couple various computing devices described herein with each other, and with other devices. Communication subsystem 412 can include wired and/or wireless communication devices compatible with one or more different communication protocols. As non-limiting examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH® radio, etc. In some embodiments, the communication subsystem can allow computing system 10 to send and/or receive messages to and/or from other devices via a network such as the Internet. It will be appreciated that one or more of the computer networks via which communication subsystem 412 is configured to communicate can include security measures such as user identification and authentication, access control, malware detection, enforced encryption, content filtering, etc., and can be coupled to a wide area network (WAN) such as the Internet.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

To the extent that terms "includes," "including," "has," "contains," and variants thereof are used herein, such terms are intended to be inclusive in a manner similar to the term "comprises" as an open transition word without precluding any additional or other elements.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

Further, the disclosure comprises configurations according to the following clauses.

Clause 1. A system for automated surface anomaly detection, the system comprising: at least one processor, communicatively coupled to non-volatile memory storing a 3D control image depicting at least a portion of an exterior of a control object and instructions that, when executed by the processor, cause the processor to: retrieve from the non-volatile memory the 3D control image; capture, by a plurality of cameras, a 3D target image depicting at least the portion of the exterior of a target object; receive the 3D target image captured by the plurality of cameras, the 3D target image depicting at least the portion of the exterior of the target object; generate 2D target planar images of the target object based on the 3D target image, using a first plurality of virtual cameras; generate 2D control planar images of the control object based on the 3D control image, the 2D control planar images corresponding to the 2D target planar images of the target object, using a second plurality of virtual cameras; detect at least one difference between the 2D target planar images and the 2D control planar images; generate an output image, wherein the output image comprises a depiction of the target object with the at least one difference indicated; and cause the output image to be displayed.

Clause 2. The system of clause 1, wherein, to generate the 2D target planar images of the target object and the 2D control planar images of the control object, the processor manipulates the 3D target image and/or the 3D target image so that point of view angles, lighting and associated shadows, and/or virtual camera distances from the target object of the 2D target planar images match point of view angles, lighting and associated shadows, and/or virtual camera distances from the control object of the 2D control planar images.

Clause 3. The system of clause 1 or 2, wherein the processor projects the 3D control image and the 3D target image in UV space.

Clause 4. The system of clause 3, wherein the processor arranges the first plurality of virtual cameras and the second plurality of virtual cameras in a grid in the UV space.

Clause 5. The system of clause 3 or 4, wherein, for every point inside the UV space, the processor identifies a corresponding point in 3D space using Barycentric coordinates.

Clause 6. The system of any of clauses 1 to 5, wherein the 3D control image and the 3D target image comprise polygons.

Clause 7. The system of clause 6, wherein the virtual cameras are instantiated at positions in 3D space facing each of the polygons in a normal direction at a predetermined distance from each of the polygons.

Clause 8. The system of any of clauses 1 to 7, wherein the target object and the control object are aircraft or aircraft components.

Clause 9. The system of any of clauses 1 to 8, wherein the at least one difference, the 2D target planar images, and the 2D control planar images are stored in the non-volatile memory and subsequently used to train a deep learning module to classify the difference.

Clause 10. A method for automated surface anomaly detection, the method comprising: retrieving from non-volatile memory a 3D control image; capturing, by a plurality of cameras, a 3D target image depicting at least a portion of an exterior of a target object; receiving the 3D target image captured by the plurality of cameras, the 3D target image depicting at least the portion of the exterior of the target object; generating 2D target planar images of the target object based on the 3D target image, using a first plurality of virtual cameras; generating 2D control planar images of a control object based on the 3D control image, the 2D control planar images corresponding to the 2D target planar images of the target object, using a second plurality of virtual cameras; detecting at least one difference between the 2D target planar images and the 2D control planar images; generating an output image, wherein the output image comprises a depiction of the target object with the at least one difference indicated; and causing the output image to be displayed.

Clause 11. The method of clause 10, wherein, to generate the 2D target planar images of the target object and the 2D control planar images of the control object, the 3D target image and/or the 3D target image is manipulated so that point of view angles, lighting and associated shadows, and/or virtual camera distances from the target object of the 2D target planar images match point of view angles, lighting and associated shadows, and/or virtual camera distances from the control object of the 2D control planar images.

Clause 12. The method of clause 10 or 11, wherein the 3D control image and the 3D target image are projected in UV space.
Clause 13. The method of any of clauses 10 to 12, wherein the first plurality of virtual cameras and the second plurality of virtual cameras are arranged in a grid in the UV space.
Clause 14. The method of any of clauses 10 to 13, wherein, for every point inside the UV space, a corresponding point in 3D space is identified using Barycentric coordinates.
Clause 15. The method of any of clauses 10 to 14, wherein the 3D control image and the 3D target image comprise polygons.
Clause 16. The method of clause 15, wherein the virtual cameras are instantiated at positions in 3D space facing each of the polygons in a normal direction at a predetermined distance from each of the polygons.
Clause 17. The method of any of clauses 10 to 16, wherein the target object and the control object are aircraft or aircraft components.
Clause 18. The method of any of clauses 10 to 17, wherein the at least one difference, the 2D target planar images, and the 2D control planar images are stored in the non-volatile memory and subsequently used to train a deep learning module to classify the difference.
Clause 19. A system for automated surface anomaly detection, the system comprising: non-volatile memory storing instructions and a 3D control image depicting at least a portion of an exterior of a control aircraft; a plurality of cameras disposed to capture a 3D target image of a portion of an exterior of a target aircraft corresponding to the portion of the exterior of the target aircraft; and at least one electronic processor, communicatively coupled to the non-volatile memory and the plurality of cameras, that executes the instructions to cause the processor to: retrieve from the non-volatile memory the 3D control image; capture, by the plurality of cameras, the 3D target image depicting at least the portion of the exterior of the target aircraft; receive the 3D target image captured by the plurality of cameras, the 3D target image depicting at least the portion of the exterior of the target aircraft; project the 3D control image and the 3D target image in UV space; identify a corresponding point in 3D space using Barycentric coordinates for every point inside the UV space; generate 2D target planar images of the target aircraft based on the 3D target image, using a first plurality of virtual cameras arranged in a grid in the UV space; generate 2D control planar images of the control aircraft based on the 3D control image, the 2D control planar images corresponding to the 2D target planar images of the target aircraft, using a second plurality of virtual cameras arranged in the grid in the UV space, the first plurality of virtual cameras and the second plurality of virtual cameras instantiated at identical positions in the 3D space; detect at least one anomaly between the 2D target planar images and the 2D control planar images; generate an output image, wherein the output image comprises a depiction of the target aircraft with the at least one anomaly annotated; and cause the output image to be displayed.
Clause 20. The system of clause 19, wherein the 3D target image and the 3D control image are 3D point clouds of at least one of thermal imaging, LiDAR, radar, or humidity sensors.

The invention claimed is:
1. A system for automated surface anomaly detection, the system comprising:
at least one processor, communicatively coupled to non-volatile memory storing a 3D control image depicting at least a portion of an exterior of a control object and instructions that, when executed by the processor, cause the processor to:
retrieve from the non-volatile memory the 3D control image;
capture, by a plurality of cameras, a 3D target image depicting at least the portion of the exterior of a target object;
receive the 3D target image captured by the plurality of cameras, the 3D target image depicting at least the portion of the exterior of the target object;
generate 2D target planar images of the target object based on the 3D target image, using a first plurality of virtual cameras;
generate 2D control planar images of the control object based on the 3D control image, the 2D control planar images corresponding to the 2D target planar images of the target object, using a second plurality of virtual cameras;
detect at least one difference between the 2D target planar images and the 2D control planar images;
generate an output image, wherein the output image comprises a depiction of the target object with the at least one difference indicated; and
cause the output image to be displayed.
2. The system of claim 1, wherein, to generate the 2D target planar images of the target object and the 2D control planar images of the control object, the processor manipulates the 3D target image and/or the 3D control image so that point of view angles, lighting and associated shadows, and/or virtual camera distances from the target object of the 2D target planar images match point of view angles, lighting and associated shadows, and/or virtual camera distances from the control object of the 2D control planar images.
3. The system of claim 1, wherein the processor projects the 3D control image and the 3D target image in UV space.
4. The system of claim 3, wherein the processor arranges the first plurality of virtual cameras and the second plurality of virtual cameras in a grid in the UV space.
5. The system of claim 3, wherein, for every point inside the UV space, the processor identifies a corresponding point in 3D space using Barycentric coordinates.
6. The system of claim 1, wherein the 3D control image and the 3D target image comprise polygons.
7. The system of claim 6, wherein the virtual cameras are instantiated at positions in 3D space facing each of the polygons in a normal direction at a predetermined distance from each of the polygons.
8. The system of claim 1, wherein the target object and the control object are aircraft or aircraft components.
9. The system of claim 1, wherein the at least one difference, the 2D target planar images, and the 2D control planar images are stored in the non-volatile memory and subsequently used to train a deep learning module to classify the difference.
10. A method for automated surface anomaly detection, the method comprising:
retrieving from non-volatile memory a 3D control image;
capturing, by a plurality of cameras, a 3D target image depicting at least a portion of an exterior of a target object;
receiving the 3D target image captured by the plurality of cameras, the 3D target image depicting at least the portion of the exterior of the target object;
generating 2D target planar images of the target object based on the 3D target image, using a first plurality of virtual cameras;

generating 2D control planar images of a control object based on the 3D control image, the 2D control planar images corresponding to the 2D target planar images of the target object, using a second plurality of virtual cameras;

detecting at least one difference between the 2D target planar images and the 2D control planar images;

generating an output image, wherein the output image comprises a depiction of the target object with the at least one difference indicated; and causing the output image to be displayed.

11. The method of claim 10, wherein, to generate the 2D target planar images of the target object and the 2D control planar images of the control object, the 3D target image and/or the 3D control image is manipulated so that point of view angles, lighting and associated shadows, and/or virtual camera distances from the target object of the 2D target planar images match point of view angles, lighting and associated shadows, and/or virtual camera distances from the control object of the 2D control planar images.

12. The method of claim 10, wherein the 3D control image and the 3D target image are projected in UV space.

13. The method of claim 12, wherein the first plurality of virtual cameras and the second plurality of virtual cameras are arranged in a grid in the UV space.

14. The method of claim 10, wherein, for every point inside the UV space, a corresponding point in 3D space is identified using Barycentric coordinates.

15. The method of claim 10, wherein the 3D control image and the 3D target image comprise polygons.

16. The method of claim 15, wherein the virtual cameras are instantiated at positions in 3D space facing each of the polygons in a normal direction at a predetermined distance from each of the polygons.

17. The method of claim 10, wherein the target object and the control object are aircraft or aircraft components.

18. The method of claim 10, wherein the at least one difference, the 2D target planar images, and the 2D control planar images are stored in the non-volatile memory and subsequently used to train a deep learning module to classify the difference.

19. A system for automated surface anomaly detection, the system comprising:

non-volatile memory storing instructions and a 3D control image depicting at least a portion of an exterior of a control aircraft;

a plurality of cameras disposed to capture a 3D target image of a portion of an exterior of a target aircraft corresponding to the portion of the exterior of the target aircraft; and at least one electronic processor, communicatively coupled to the non-volatile memory and the plurality of cameras, that executes the instructions to cause the processor to:

retrieve from the non-volatile memory the 3D control image;

capture, by the plurality of cameras, the 3D target image depicting at least the portion of the exterior of the target aircraft;

receive the 3D target image captured by the plurality of cameras, the 3D target image depicting at least the portion of the exterior of the target aircraft;

project the 3D control image and the 3D target image in UV space;

identify a corresponding point in 3D space using Barycentric coordinates for every point inside the UV space;

generate 2D target planar images of the target aircraft based on the 3D target image, using a first plurality of virtual cameras arranged in a grid in the UV space;

generate 2D control planar images of the control aircraft based on the 3D control image, the 2D control planar images corresponding to the 2D target planar images of the target aircraft, using a second plurality of virtual cameras arranged in the grid in the UV space, the first plurality of virtual cameras and the second plurality of virtual cameras instantiated at identical positions in the 3D space;

detect at least one anomaly between the 2D target planar images and the 2D control planar images;

generate an output image, wherein the output image comprises a depiction of the target aircraft with the at least one anomaly annotated; and cause the output image to be displayed.

20. The system of claim 19, wherein the 3D target image and the 3D control image are 3D point clouds of at least one of thermal imaging, LiDAR, radar, or humidity sensors.

* * * * *